Figure 1:
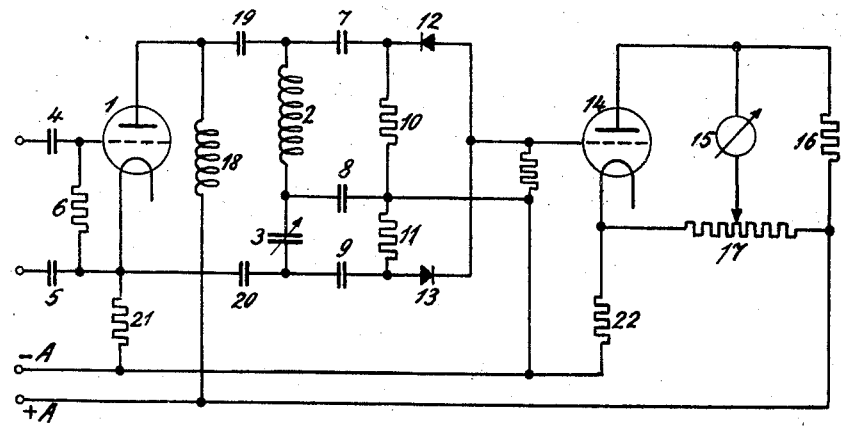

June 10, 1941.  K. H. HOFMANN  2,244,775

ELECTRICAL OSCILLATORY CIRCUITS

Filed Aug. 25, 1938

Inventor:
Karl-Heinz Hofmann
by
Attorney

Patented June 10, 1941

2,244,775

UNITED STATES PATENT OFFICE 2,244,775

ELECTRICAL OSCILLATORY CIRCUITS

Karl Heinz Hofmann, Berlin, Germany, assignor to C. Lorenz Aktiengesellschaft, Berlin-Tempelhof, Germany, a company Application August 25, 1938, Serial No. 226,735
In Germany June 26, 1937

2 Claims. (Cl. 250—40)

The invention relates to a method for indicating the resonance and phase position of electrical oscillatory circuits. It is based on the fact that in oscillatory circuits in resonance the electrical magnitudes of the self-inductance circuit in-phase opposition are equal to those of the condenser circuit. With series oscillatory circuits the potential effective on the self-inductance in resonance in phase opposition is equal to the potential existing on the condenser. With parallel oscillatory circuits in resonance the current of the coil branch in phase opposition is equal to the current of the condenser branch. In accordance with the invention the electrical magnitudes of the self-inductance circuit and the condenser circuit are separately tapped and compared with each other in an indicator. In resonance the two electrical magnitudes are equal to each other in phase opposition which is indicated by the indicator.

An electron tube in the anode circuit of which an indicating instrument is inserted is, for example, used as indicator for the comparison of the electrical magnitudes tapped on the two branches of the oscillatory circuit. In the case of series resonance potentials are tapped on the oscillatory circuit in the coil and on the condenser separately, which potentials are rectified and applied with opposite polarity to the grid of said electron tube. In resonance both potentials are equal and opposite, so that the indicating instrument inserted in the anode circuit shows a previously set value. With capacitive or inductive detuning either the one potential or the other predominates so that the operative point of the tube is displaced upward or downward on the characteristic, and the indicating instrument reacts to this detuning in accordance with the variation of the current.

If the methods of indication in parallel oscillatory circuits are to be used in which, as already indicated in resonance the coil and condenser currents are equal to each other in phase opposition, then in accordance with the invention resistances are inserted in the oscillatory circuit on which potentials in proportion to the currents are tapped, which in turn are rectified and conveyed in a manner described with opposite polarity to the grid of an electron tube, in the anode circuit of which there is an indicating instrument. If the oscillatory circuit to be tested is so changed that either the self-inductance current or the condenser changing current predominates, then on the grid of the indicating tube a more positive or more negative potential is effected.

The anode current of the tube drops in accordance with this change of potential as opposed to the value adjusted in the case of resonance or rises. By suitable calibration of the instrument the value of the detuning can then be read directly.

The invention will be explained in more detail by means of an example with the accompanying drawing. In Fig. 1 the arrangement is shown in the case of a series oscillatory circuit, and in Fig. 2 for the case of a parallel oscillatory circuit. In Fig. 1 in the anode circuit of the tube 1 there is a series oscillatory circuit consisting of the self-inductance coil 2 and the capacity 3. Over condensers 4 and 5 and the grid resistance 6 there is supplied to the grid of the tube 1 an alternating potential for the frequency of which the resonance position is to be determined to the oscillatory circuits 2, 3. In accordance with the invention on the terminals of the condenser 3 and inductance 2 separate potentials are tapped which are conveyed over the condensers 7, 8 and 9, and the loading resistances 10 and 11 to the rectifiers 12 and 13, and rectified in the latter. These rectifiers are oppositely connected so that the two potentials arrive with opposite sign thence on the grid of the tube 14 in the anode circuit of which the indicating instrument is inserted. This indicating instrument in the case of resonance, that is with equality of the coil and condenser potential, is adjusted with the aid of the potential resistances 16—17 to a certain zero value. With detuning of the oscillatory circuit according to whether an inductive or capacitive detuning exists either the coil potential or the condenser potential 6 dominates. The operative point of the tube is displaced from the characteristic either upwards or downwards so that the anode current rises or falls, which is indicated on the instrument 15. The anode direct potential is conveyed to the tube 1 over the choke 18, and the disconnection of the direct potential from the alternating potential conveyed to the oscillatory circuit takes place through the condensers 19 and 20. The grid bias of the tubes is adjusted with the aid of the cathode resistances 21 and 22.

Figure 2:
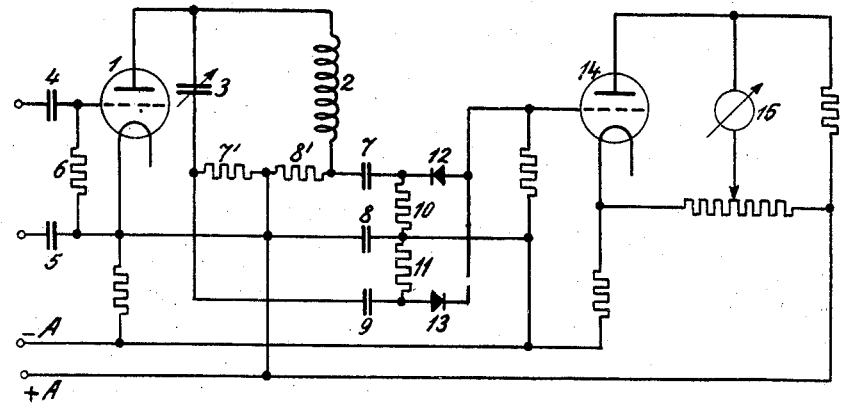

Fig. 2 shows the arrangement in the case of the parallel oscillatory circuit which is inserted in the anode circuit of the tube 1 and is formed by the self-inductance 2 and the capacity 3. There is conveyed to the grid of the tube 1, as in the first mentioned case, over the condensers 4 and 5 and the grid resistance 6 an alternating potential for the frequency of which the resonance position of the oscillatory circuit 2, 3 is to be determined. In the oscillatory circuit the resistances 7', 8' are so inserted that in one resistance the condenser charging current flows, and in the second the self-inductance current. These resistances may be effective resistances or reactances, that is, ohmic resistances over inductances or capacities. The only condition is that both resistances must be of the same type and the same value. If the oscillatory circuit is so tuned that it is in resonance for the impressed frequency, then the current in the resistance 7' is equal to the current in the resistance 8'. As both resistances are of the same value, the potentials tapped on their terminals and in proportion to the currents are also equal to one another. These potentials are conveyed over the condensers 7, 8 and 9 and the loading resistances 10 and 11 to the oppositely connected rectifiers 12 and 13 and thence applied with opposite sign to the grid of the tube 14 in the anode circuit of which in turn there is an indicating instrument 15 which in resonance is adjusted in the manner described over potentiometer resistances to a certain value. When the oscillatory circuit is detuned either the coil current or the condenser current dominates. In accordance with these currents in the tube 14 a higher or a lower potential than the fixed bias is effective so that the anode current rises or drops. The other circuit elements shown in Fig. 2 such as resistances and condensers correspond to those of Fig. 1, and will be understood in their effect without further description.

The use of the new method is very wide. It may be used both for high frequency and also for low frequency. It can, for example, be employed in order to test the self-inductance or the capacity of coils or condensers by comparison with normal values. Moreover, the arrangement is suitable for frequency testing or for control of the frequency constancy of alternating potentials. Moreover, the device may be used as control member for an automatic resonance tuning of oscillatory circuits at transmitters or receivers. In the last mentioned case then the indicating instrument connected in the anode circuit of the indicator tube may be replaced by a corresponding control member which electrically or mechanically influences the oscillation constants.

What is claimed is:

1. Phase indicating means for electrical oscillatory circuits having an inductance and a capacity connected in parallel with each other comprising impedances connected in series with said inductance and said capacity respectively to produce separate currents in said impedances proportional to the respective charging currents of said inductance and said capacity, rectifier means coupled to said impedance for separately rectifying currents proportional to the separate voltages across said impedances and means for comparing said rectified currents comprising means for combining the resulting rectified currents in opposition and producing a voltage from the currents so combined, an electron tube, means for applying said voltage to the input of said tube, and indicating means connected to the output of said tube.

2. Phase indicating means according to claim 1 wherein said impedances are resistances.

KARL HEINZ HOFMANN.